(12) United States Patent
Okandan et al.

(10) Patent No.: US 9,222,810 B1
(45) Date of Patent: Dec. 29, 2015

(54) IN SITU CALIBRATION OF A LIGHT SOURCE IN A SENSOR DEVICE

(71) Applicant: Sandia Corporation, Albuquerque, NM (US)

(72) Inventors: Murat Okandan, Edgewood, NM (US); Darwin K. Serkland, Albuquerque, NM (US); Bion J. Merchant, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 58 days.

(21) Appl. No.: 14/031,863

(22) Filed: Sep. 19, 2013

(51) Int. Cl.
*G01D 18/00* (2006.01)

(52) U.S. Cl.
CPC ...................... *G01D 18/00* (2013.01)

(58) Field of Classification Search
CPC ............. G01M 11/00; G01B 9/02062; G01B 9/02067
USPC ........................................................ 356/450
See application file for complete search history.

(56) References Cited

U.S. PATENT DOCUMENTS

| | | | |
|---|---|---|---|
| 6,995,848 B2 | 2/2006 | Deck | |
| 8,331,409 B1 | 12/2012 | Liang et al. | |
| 2003/0132375 A1* | 7/2003 | Blazo | 250/252.1 |
| 2003/0189709 A1 | 10/2003 | Maynard et al. | |
| 2005/0073690 A1* | 4/2005 | Abbink et al. | 356/451 |
| 2006/0250618 A1 | 11/2006 | Kawasaki | |
| 2011/0110387 A1 | 5/2011 | Maleki et al. | |
| 2011/0122906 A1* | 5/2011 | Seeley et al. | 372/38.07 |
| 2012/0039346 A1 | 2/2012 | Liang et al. | |
| 2014/0176963 A1* | 6/2014 | Kemp | 356/497 |

* cited by examiner

*Primary Examiner* — Jonathan Hansen
(74) *Attorney, Agent, or Firm* — Helen S. Baca (57) ABSTRACT

A sensor device is described herein, wherein the sensor device includes an optical measurement system, such as an interferometer. The sensor device further includes a low-power light source that is configured to emit an optical signal having a constant wavelength, wherein accuracy of a measurement output by the sensor device is dependent upon the optical signal having the constant wavelength. At least a portion of the optical signal is directed to a vapor cell, the vapor cell including an atomic species that absorbs light having the constant wavelength. A photodetector captures light that exits the vapor cell, and generates an electrical signal that is indicative of intensity of the light that exits the vapor cell. A control circuit controls operation of the light source based upon the electrical signal, such that the light source emits the optical signal with the constant wavelength.

20 Claims, 5 Drawing Sheets

IN SITU CALIBRATION OF A LIGHT SOURCE IN A SENSOR DEVICE

STATEMENT OF GOVERNMENTAL INTEREST

This invention was developed under Contract DE AC04-94AL85000 between Sandia Corporation and the U.S. Department of Energy. The U.S. Government has certain rights in this invention.

BACKGROUND

Various sensor devices, when used in certain applications, must output measurement signals (e.g., that describe a parameter such as temperature, vibration, etc.) with high accuracy and resolution. For example, a seismometer that is utilized to detect seismic events, to be useful in many applications, must output a measurement signal that is as accurate as possible with relatively high resolution.

Sensor devices configured to generate relatively accurate measurement signals often include an optical measurement system that is configured to measure displacement of an optical signal relative to a reference optical signal. For example, a sensor device may include an interferometer, which is generally configured to ascertain a difference between a reference optical signal and an optical signal that is indicative of a parameter that is desirably measured. Conventionally, a light source corresponding to the sensor device that is utilized to generate the reference optical signal is calibrated offline (e.g. in a laboratory environment) prior to the sensor device being deployed. When the sensor device outputs measurements in the field, an assumption is made that the operation of the light source has not changed. In other words, an assumption is made that a wavelength of an optical signal emitted by the light source has not drifted (or that the drift is accepted). This assumption is typically made for some period of time (e.g., one month), and thereafter the sensor device is removed from operation and the light source is recalibrated.

It can be ascertained that operation of a sensor device in this manner is less than ideal. Specifically, immediately after the sensor device is deployed, an assumption is made pertaining to measurement signals output by the sensor device (e.g., that the wavelength of the signal emitted by the light source has not changed since the light source was calibrated). Furthermore, when recalibration of the light source is undertaken, the sensor device is removed from the field, thereby requiring redundant sensor devices or a time period where no measurements are being generated.

SUMMARY

The following is a brief summary of subject matter that is described in greater detail herein. This summary is not intended to be limiting as to the scope of the claims.

Described herein are various technologies pertaining to in situ calibration of a light source in a sensor device, wherein the sensor device comprises an optical measurement system, such as an interferometer or, an optical resonator (such as an etalon), etc. As used herein, the term "interferometer" is intended to encompass an interferometer and an optical resonator. The sensor device can be, for example, a microphone, a magnetometer, an accelerometer, a gyroscope, a seismometer, a gravimeter, or other suitable sensor device that comprises an optical measurement system that is configured to output a relatively high accuracy, high resolution measurement. It can therefore be ascertained that the sensor device employs a stable reference optical signal in connection with outputting a measurement of a particular parameter, such as pressure, temperature, humidity, or any other parameter that can be related to an accurate stable reference signal.

In the sensor device, a monochromatic light source (e.g., such as a vertical-cavity surface-emitting laser (VCSEL)) is configured to emit an optical signal. The sensor device further includes a calibration system that receives the optical signal, wherein, for example, the calibration system can include at least one beam splitter that splits the optical signal into a reference signal and a second optical signal, wherein the reference signal desirably has a wavelength that remains constant over time. The optical measurement system receives the reference signal and can output a relatively highly accurate, highly resolute measurement of a parameter based at least in part upon the reference signal.

The calibration system further includes a filter that receives at least a portion of the second optical signal. The filter is configured to absorb light having the constant wavelength, and as such may perform a filtering function. For example, the filter can be a vapor cell that comprises an atomic species that is configured to absorb light having the constant wavelength—accordingly, the constant wavelength can be an absolute reference. A photodetector can be positioned to capture an optical signal that exits the vapor cell. At least one value can be read from the photodetector, wherein the at least one value is indicative of intensity of the optical signal captured by the photodetector. If the optical signal emitted by the light source has drifted, and thus the reference signal has drifted, the intensity of the optical signal captured by the photodetector will be higher when compared to the intensity of the optical signal captured by the photodetector when the light source emits the optical signal having the constant wavelength. Accordingly, the light source can be controlled based upon the at least one value read from the photodetector, such that the light source is calibrated in situ.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to in situ calibration of a light source included in a sensor device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
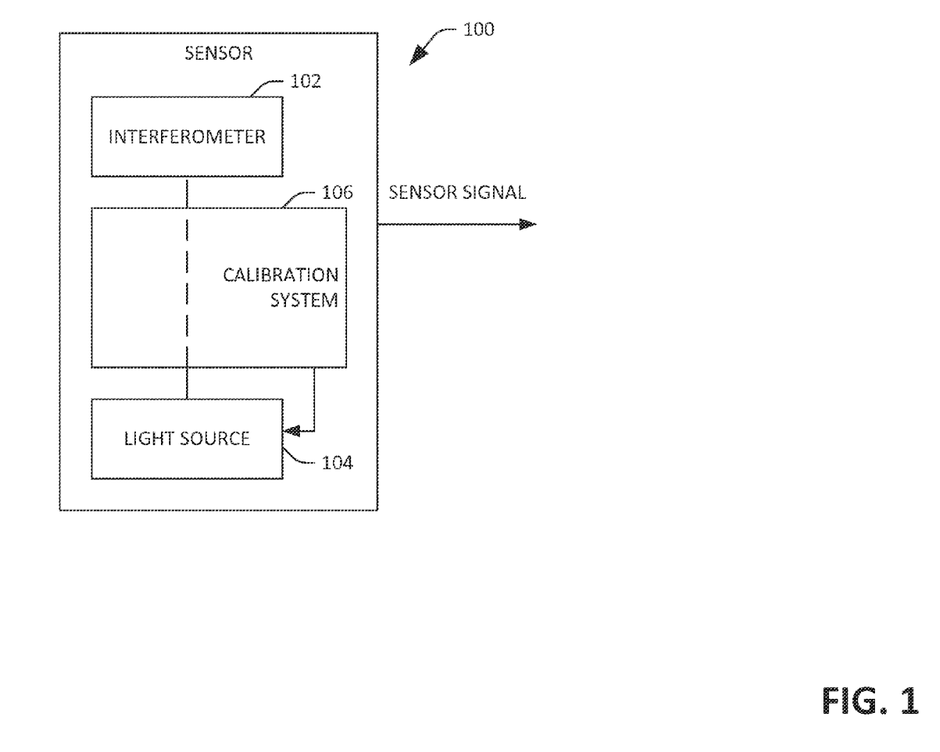
FIG. 1 is a functional block diagram of an exemplary sensor device that comprises a light source that is calibrated in situ.

With reference now to FIG. 1, an exemplary sensor device 100 that is configured to output a relatively high resolution (and highly accurate) measurement with respect to a particular parameter is illustrated. For example, the sensor device 100 can be a microphone, a magnetometer, an accelerometer, a thermometer, a gyroscope, a seismometer, a gravimeter, etc. The sensor device 100 is configured to output a sensor signal, wherein such signal can be a measurement of the parameter. Accordingly, the sensor signal can be indicative of temperature corresponding to the sensor device 100, pressure corresponding to the sensor device 100, vibration corresponding to the sensor device 100, etc.

In connection with outputting a high resolution measurement, the sensor device 100 can include an optical measurement system, such as an interferometer 102. Although the sensor device 100 is shown in the figure as including the interferometer, it is to be understood that the sensor device 100 may include an alternative, or an additional, optical measurement system. The sensor device 100 additionally includes a light source 104 that is configured to output an optical signal, a portion of which is received by the interferometer 102 as a reference signal. In an exemplary embodiment, the light source 104 may be any suitable microscale light source and/or monochromatic light laser, such as a vertical-cavity surface-emitting laser (VCSEL). The interferometer 102 can include suitable optics that facilitate outputting a measurement signal based upon the reference signal. The interferometer 102 can include a beam splitter (not shown in the figure) that splits the reference signal into two light waves. The interferometer 102 can further include a mirror, physical displacements of which are indicated by the measurement signal in response to changes in the optical interference between the two light waves. Errors in the measurement signal can occur, however, if the amplitude or frequency of the reference signal changes. Thus, it is desirable to stabilize the light source 104 and/or identify frequency and amplitude changes of the reference signal, thereby allowing for correction of the measurement signal.

It is advantageous to employ stabilizing techniques to assure that the light source 104 will output the optical signal with a constant wavelength over time (referred to herein as the "constant wavelength"). More specifically, the interferometer 102 can, as explained above, receive a reference signal which is at least a portion of the optical signal emitted from the light source 104. It will be understood from the preceding discussion that stabilization is desirable so that the reference signal emitted by the light source 104 will have the constant wavelength. As noted above, the interferometer 102 utilizes conventional techniques to measure a displacement of a mirror based upon the reference signal.

The sensor device 100 additionally includes a calibration system 106 that receives the optical signal emitted from the light source 104 and calibrates the light source 104 and/or the measurement signal, in situ, responsive to receiving the optical signal from the light source 104. In an exemplary embodiment, the calibration system 106 can calibrate the light source 104 based upon an absolute reference. For instance, it may be desirable for the light source 104 to output an optical signal having a constant wavelength that corresponds to the absorption frequency of a particular atomic species (e.g., about 842 nm) regardless of operating conditions pertaining to the sensor device 100.

Generally, based upon the optical signal output by the light source 104, the calibration system 106 can control at least one parameter pertaining to the light source 104 that stabilizes the light source 104; e.g., that causes the light source 104 to emit optical signals at the constant wavelength. In an exemplary embodiment, the calibration system 106 can be configured to control a drive signal of the light source 104, wherein a wavelength of the optical signal emitted by the light source 104 is a function of the drive signal. The drive signal can be a drive current that is configured to heat or cool a stage upon which the light source 104 (e.g., laser) is mounted, a drive current that is configured to cause the light source 104 to generate more or less light, a voltage that is applied to alter an electric field corresponding to the light source, or the like. In another exemplary embodiment, the calibration system 106 can be configured to control a temperature corresponding to the light source 104, wherein a wavelength of the optical signal emitted by the light source is a function of the temperature corresponding to the light source 104.

The sensor device 100 exhibits many advantages over conventional sensor devices and calibration techniques. For instance, it can be ascertained that the light source 104 and the calibration system 106 can be integrated into the sensor device 100. In contrast, in conventional approaches, a light source and/or calibration system are external to the sensor device. Furthermore, conventionally, a calibration system resides in a laboratory environment, such that to calibrate a light source of a sensor device, the sensor device is removed from the field. Additionally, conventional sensor devices and/or calibration systems tend to consume relatively large amounts of power. Pursuant to an example, a conventional calibration system can employ a (large) benchtop laser that consumes a watt or more of power to emit optical signals. In contrast, since the light source 104 can be a microscale light source, such as a VCSEL, power consumed by the light source 104 to emit an optical signal may be between 1 mW and 20 mW. Further, the calibration system 106 may be included in a housing that fits within an envelope of lateral dimensions between 0.5 and 3 inches or less, which is about one-fourth the lateral extent of conventional calibration systems. The relatively small size of the calibration system 100 allows the calibration system 106 to be readily incorporated in the sensor device 100.

In another exemplary embodiment, in addition to controlling the parameter related to the light source 104 or as an alternative to controlling the parameter related to the light source 104, the calibration system 106 can be employed to correct measurement signals output by the interferometer. For example, the calibration system 106 can be configured to detect changes in frequency and/or changes in amplitude of the optical signal emitted by the light source 104, and can correct a measurement signal output by the interferometer based upon the detected changes in frequency and/or changes in amplitude.

Figure 2:
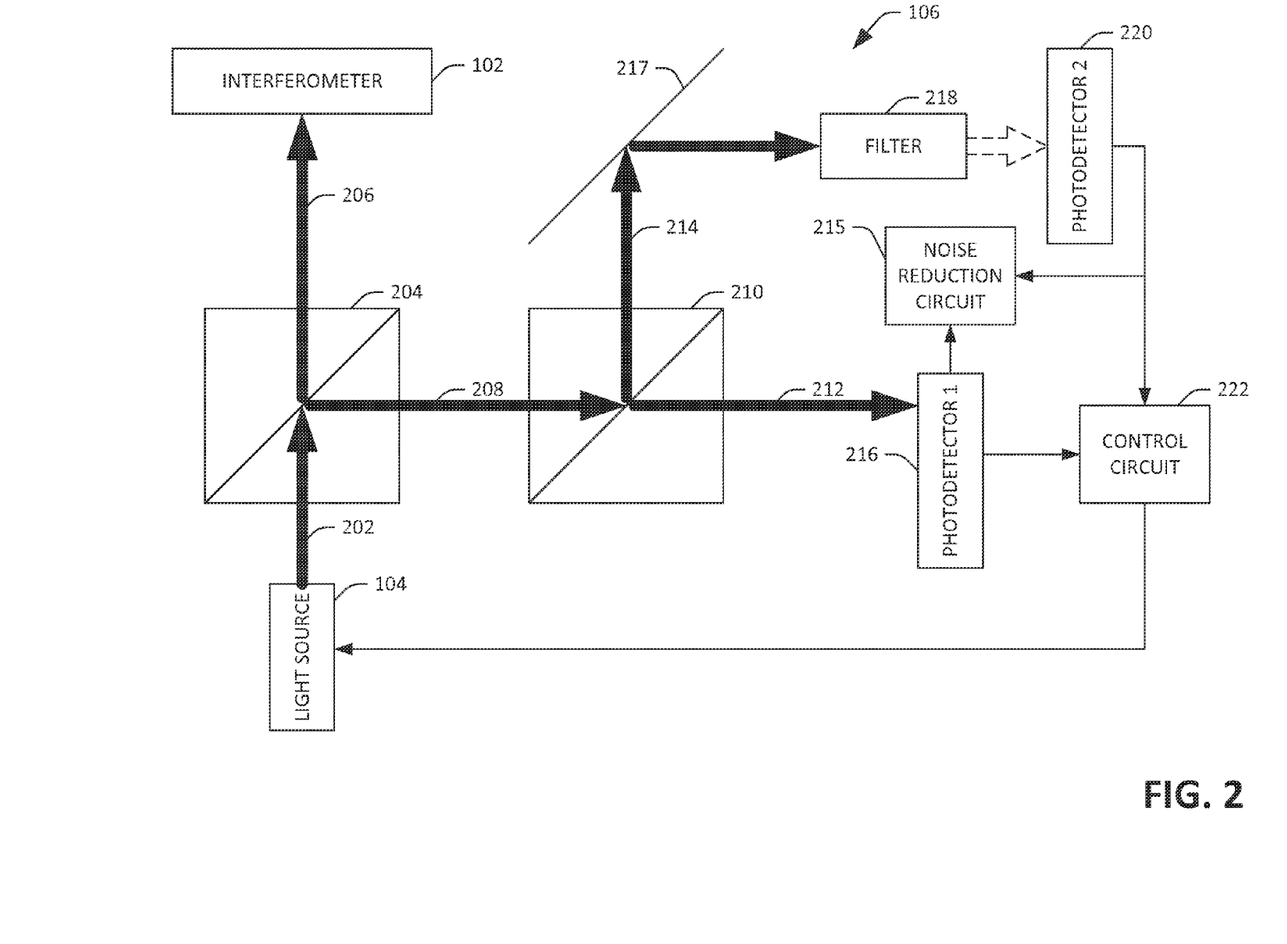
FIG. 2 illustrates an exemplary calibration system that is included in a sensor device, the calibration system configured to calibrate a light source of the sensor device in situ.

With reference now to FIG. 2, an exemplary depiction of the calibration system 106 is illustrated. As noted above, the light source 104 emits an optical signal 202, wherein the optical signal 202 desirably has a constant (stabilized) wavelength and amplitude. The calibration system 106 can include a first beam splitter 204 that is configured to split the optical signal 202 into a reference signal 206 and a second optical signal 208. The interferometer 102 receives the reference signal 206 and outputs a measurement signal based at least in part upon the reference signal 206.

The calibration system 106 may further optionally include a second beam splitter 210 that splits the second optical signal 208 into a first test signal 212 and a second test signal 214. In an exemplary embodiment, the second test signal 214 can be a relatively small portion of the optical signal 202 emitted by the light source 104. For example, the second test signal 214 may be between 2% and 7% of the optical signal 202 emitted by the light source 104. Accordingly, between 2% and 7% of power driving the light source 104 is used to generate the second test signal 214.

The calibration system 106 can optionally include a first photodetector 216 that is positioned relative to the second beam splitter 210 to capture the first test signal 212 and emit an electrical signal responsive to capturing the first test signal 212. In an exemplary embodiment, the first photodetector 216 can be employed to measure an amplitude of the first test signal 212, and thus an amplitude of the optical signal (and the reference signal). A noise reduction circuit 215 can receive the electrical signal from the first photodetector 216, and can reduce mode noise in a measurement generated by the interferometer 102 based upon the electrical signal received from the first photodetector 216. With more particularity, the noise reduction circuit 215 can receive a measurement signal from the interferometer 102 and the electrical signal from the first photodetector 216 and compute a ratio signal, which is the measurement signal divided by the electrical signal from the first photodetector 216. The noise reduction circuit 215 can thereafter subtract the ratio signal from the measurement signal, thereby reducing mode noise in the measurement signal. Further, alterations in the electrical signal from the first photodetector 216 over time can be identified, and used in connection with stabilizing the light source 104.

The calibration system 106 may further optionally include a mirror 217 that reflects the second test signal 214. A filter 218 is positioned relative to the mirror 217 to receive the second test signal 214 subsequent to the second test signal 214 being reflected by the mirror 217. The filter 218 is intended to encompass any suitable system that can, at a relatively high resolution, be used in determining whether the second test signal has the constant wavelength. In an example, the filter 218 can include a vapor cell that comprises an atomic species that absorbs light (photons) at a particular wavelength that has been designated to be the constant wavelength. For instance, the vapor cell may include a cesium atomic species having an absorption line of approximately 852 nm. In such an example, the constant wavelength of light desirably emitted by the light source 104 is the absorption wavelength of the cesium atomic species. While not shown, the vapor cell may be included in a temperature controlled cavity, thus allowing the constant wavelength to be absolute. With more particularity, since the absorption frequency of the atomic species can vary as a function of temperature, holding temperature of the vapor cell constant can cause the absorption frequency of the atomic species in the vapor cell to remain constant. In another example, the filter 218 may be or include an optical resonator, such as a Fabry-Perot etalon or a ring resonator. When the filter 218 is an optical resonator, light having a particular resonant frequency (e.g., having a constant wavelength) is selectively transmitted from the optical resonator. That is, if light provided to the optical resonator has the particular resonant frequency, the optical resonator selectively transmits such light. Moreover, amplitude of the light exiting the optical resonator depends upon amplitude of the light entering the optical resonator.

The calibration system 106 further includes a second photodetector 220 that is positioned relative to the filter 218 to capture light that exits the filter 218. The second photodetector 220 generates a second electrical signal responsive to capturing light that exits the filter 218, the second electrical signal being indicative of an intensity of the light captured by the second photodetector 220. Thus, if the filter 218 includes a vapor cell, it can be ascertained that when the light source 104 emits the optical signal 202 at the absorption wavelength of the vapor cell, the vapor cell will absorb such light, causing the second photodetector 220 to capture a relatively small amount of light. Thus, a value of the second electrical signal output by the second photodetector 220 is indicative of whether or not the light source 104 is emitting the optical signal 202 at the constant wavelength (e.g., the absorption wavelength of the vapor cell). That is, when the wavelength of the optical signal 202 has drifted, then at least a portion of the second test signal 214 passes through the vapor cell and is captured by the second photodetector 220, which generates the second electrical signal with a value that indicates that drift has occurred.

If the filter 218 includes an optical resonator, it can be ascertained that when the light source emits the optical signal 202 at the resonant frequency of the optical resonator, a relatively large amount of light will exit the optical resonator and be captured by the second photodetector 220. Accordingly, a value of the second electrical signal output by the second photodetector 220 is indicative of whether or not the light source 104 is emitting the optical signal 202 at the constant wavelength (e.g., the resonant frequency of the optical resonator).

A control circuit 222 is electrically coupled to the second photodetector 220 and receives the second electrical signal generated by the second photodetector 220. The control circuit 222 can also optionally be electrically coupled to the first photodetector 216 and can receive the first electrical signal generated by the first photodetector 216. The control circuit 222 controls at least one parameter pertaining to the light source 104 based upon the second electrical signal received from the second photodetector 220 and optionally the first electrical signal received from the first photodetector 216. For instance, if the filter 218 is an optical resonator, alteration in amplitude of the optical signal can change a value of the electrical signal output by the second photodetector 220, even if the frequency of the optical signal remains constant. Thus, in an exemplary embodiment, the control circuit 222 can control the at least one parameter pertaining to the light source 104 based upon the electrical signal output by the first photodetector 216 and the second electrical signal output by the second photodetector 220.

In an example, the control circuit 222 can control a drive signal provided to the light source 104. Thus, the control circuit 222 can control the drive signal in connection with controlling temperature corresponding to the light source 104. In another example, the control circuit 222 can control the drive signal in connection with controlling an amount of light generated by the light source 104. In still yet another example, the control circuit 222 can control the drive signal in connection with controlling an amount of light generated by the light source 104 and temperature corresponding to the light source 104. Generally, then, the control circuit 222 controls the at least one parameter of the light source 104 to mitigate drift corresponding to the optical signal 202 emitted by the light source 104 (e.g., to maintain the optical signal 202 at the constant wavelength).

In an exemplary embodiment, the control circuit 222 can be implemented as a general purpose processor (e.g., CPU) that is programmed to control operation of the light source 104 as described above. In another example, the control circuit 222 can be implemented as a Field-programmable Gate Array (FPGA), an Application-specific Integrated Circuit (ASIC), an Application-specific Standard Product (ASSP), a System-on-a-chip (SOC), a Complex Programmable Logic Device (CPLD), etc.

In another exemplary embodiment, the noise reduction circuit 215 can correct a measurement signal output by the interferometer 102 based upon the electrical signal output by the first photodetector 216 and the electrical signal output by the second photodetector 220. For instance, generally, output of the first photodetector 216 can be monitored to identify an alteration in amplitude of the first test signal 212 over time (and thus an alteration in amplitude of the reference signal 206 over time), and output of the second photodetector 220 can be monitored to identify an alteration in frequency of the second test signal 214 over time (and thus an alteration in frequency of the reference signal 206 over time). The noise reduction circuit 215 can correct a measurement signal output by the interferometer based upon the identified alteration in amplitude and/or frequency of the reference signal 206.

The first photodetector 216 and/or the second photodetector 220 can be or include any suitable type of photodetector, including (but not limited to) a complementary metal-oxide semiconductor (CMOS) sensor, a charge-coupled device (CCD) sensor, a photodiode, a reverse-biased light emitting diode (LED), a photoresistor, a photovoltaic cell, a phototube, a phototransistor, etc.

In an exemplary embodiment, for purposes of ease of manufacturing and/or assembly, the first photodetector 216 and the second photodetector 220 may be coplanar in the sensor device 100. Further, for instance, the first photodetector 216 and the second photodetector 220 may reside on a common substrate. Additionally, as indicated above, the second beam splitter 210, the first photodetector 216, and the mirror 217 are optionally included in the calibration system 106. Pursuant to an example, the filter 218 can be positioned relative to the first beam splitter 204 to receive the second optical signal 208 directly, and the second beam splitter 210, the first photodetector 216, and the mirror 217 can be removed from the calibration system 106. In another example, the filter 218 can be positioned relative to the second beam splitter 210 to directly receive the second test signal 214, so that mirror 217, for example, may be omitted from the calibration system 106.

Figure 3:
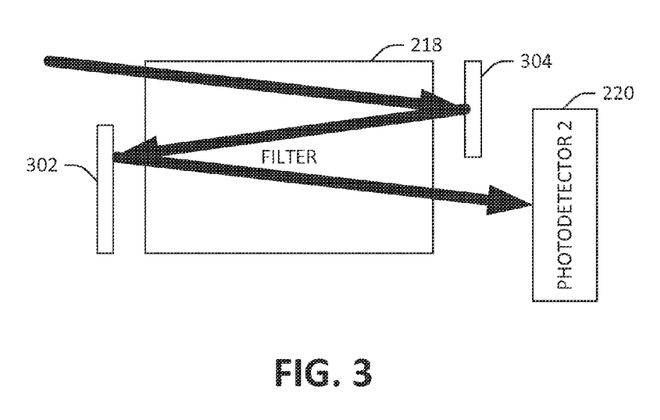
FIG. 3 illustrates an exemplary vapor cell and mirror arrangement that can optionally be included in a calibration system of a sensor device.

With reference now to FIG. 3, an exemplary depiction of the filter 218 is illustrated, wherein the filter 218 is a vapor cell. As shown, the vapor cell can receive the second test signal 214. A first mirror 302 can be positioned to reflect any portion of the second test signal 214 not absorbed by the vapor cell back through the vapor cell. A second mirror 304 can be positioned to again reflect any portion of the test signal 214 not absorbed during the first two passes therethrough back through the vapor cell. The second photodetector 220 is positioned relative to the vapor cell to capture any portion of the second test signal 214 that has not been absorbed after three traversals through the vapor cell. Inclusion of the first mirror 302 and the second mirror 304 with the vapor cell effectively extends the interaction length of the vapor cell. Therefore, size (length) of the vapor cell can be reduced when the first mirror 302 and the second mirror 304 are positioned as shown in FIG. 3. In an exemplary embodiment, the vapor cell can have a length (L) between 0.5 cm and 1 cm, which can allow for further miniaturization of the calibration system 106. While the vapor cell is shown as having the two mirrors 302 and 304 associated therewith, it is to be understood that more or fewer mirrors may be associated with the vapor cell, depending upon a length of the vapor cell and a desired interaction length with the second test signal 214.

Figure 4:
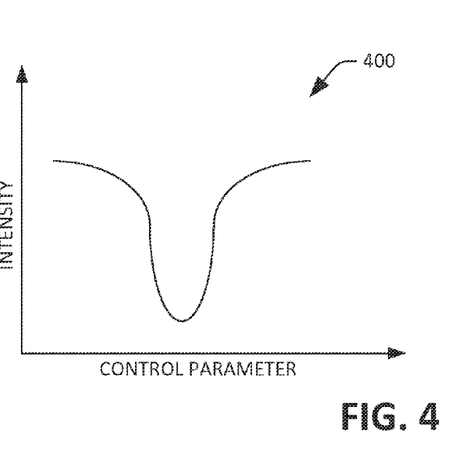
FIG. 4 is an exemplary graph that depicts values of a control parameter corresponding to a light source relative to intensity of an optical signal captured by a photodetector.

Now referring to FIG. 4, an exemplary graph 400 that depicts intensity of the light captured by the second photodetector 220, when the filter 218 is a vapor cell, relative to a value of a control parameter (e.g., drive signal) used to control operation of the light source 104 is illustrated. As shown, as a value of the control parameter is changed, an intensity of light captured by the second photodetector 220 (e.g., a value of the second electrical signal) is likewise changed. Thus, the control circuit 222 can be configured to control operation of the light source 102 based upon first order detection of lowest light throughput through the vapor cell, thereby allowing wavelength of light emitted by the light source 104 to be precisely adjusted.

Figure 5:
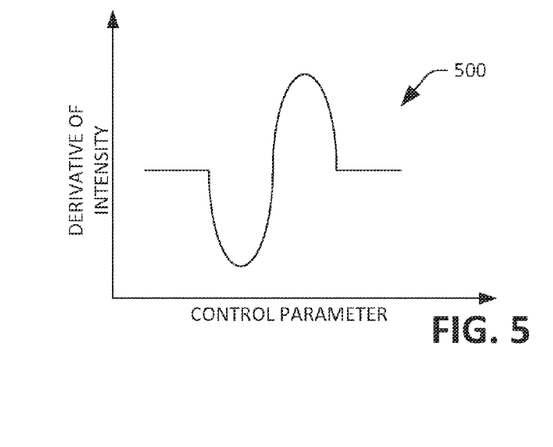
FIG. 5 is an exemplary graph that depicts values of a control parameter corresponding to a light source relative to a derivative of intensity of an optical signal captured by a photodetector.

Turning now to FIG. 5, an exemplary graph 500 that depicts a derivative of the intensity of light captured by the second photodetector 220, when the filter is a vapor cell, relative to the value of the control parameter is illustrated. In an exemplary embodiment, a value of the control parameter that yields a minimum on the graph 500 can be used by the control circuit 222 to control operation of the light source 104.

Figure 6:
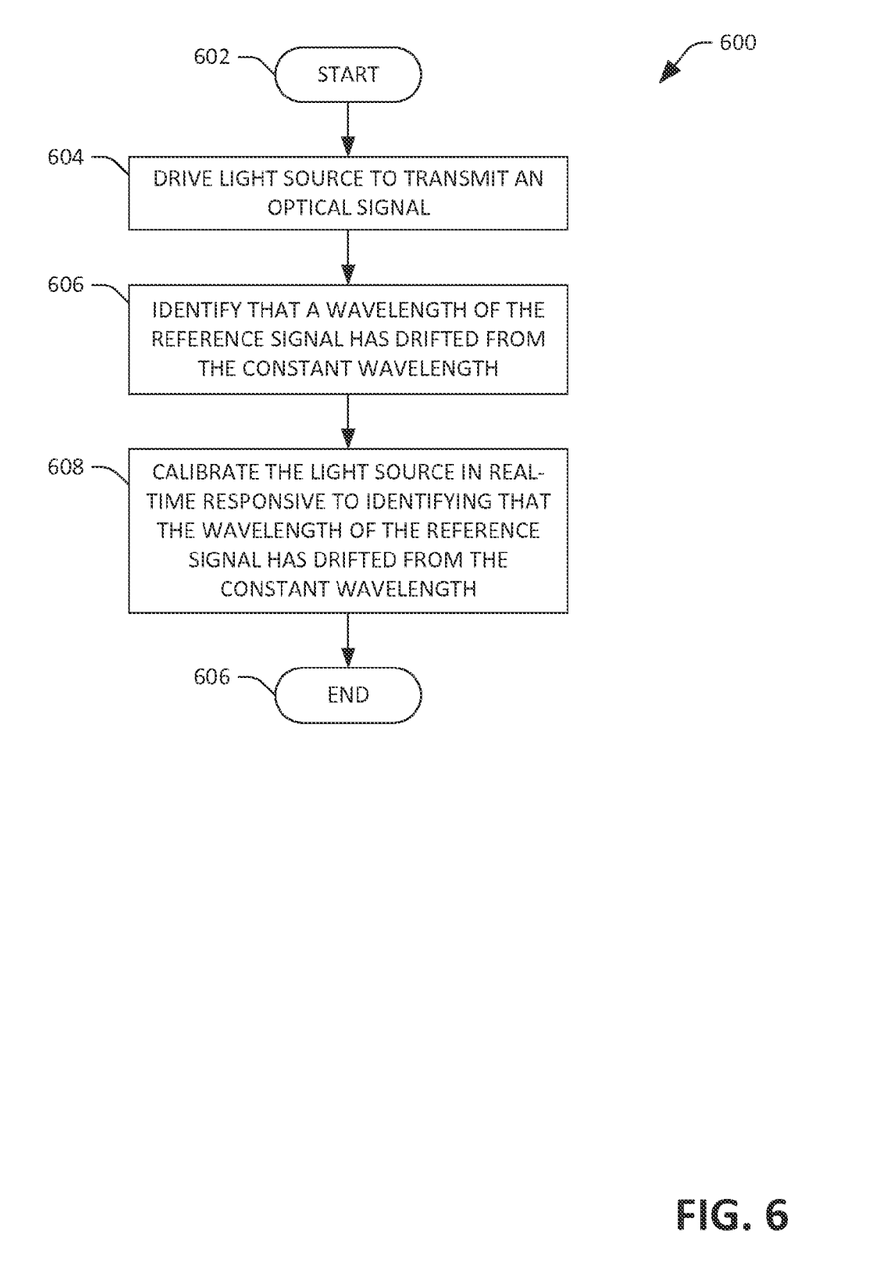
FIG. 6 is a flow diagram illustrating an exemplary methodology for calibrating a light source in situ, wherein the light source is included in a sensor device that outputs a high resolution measurement.
Figure 7:
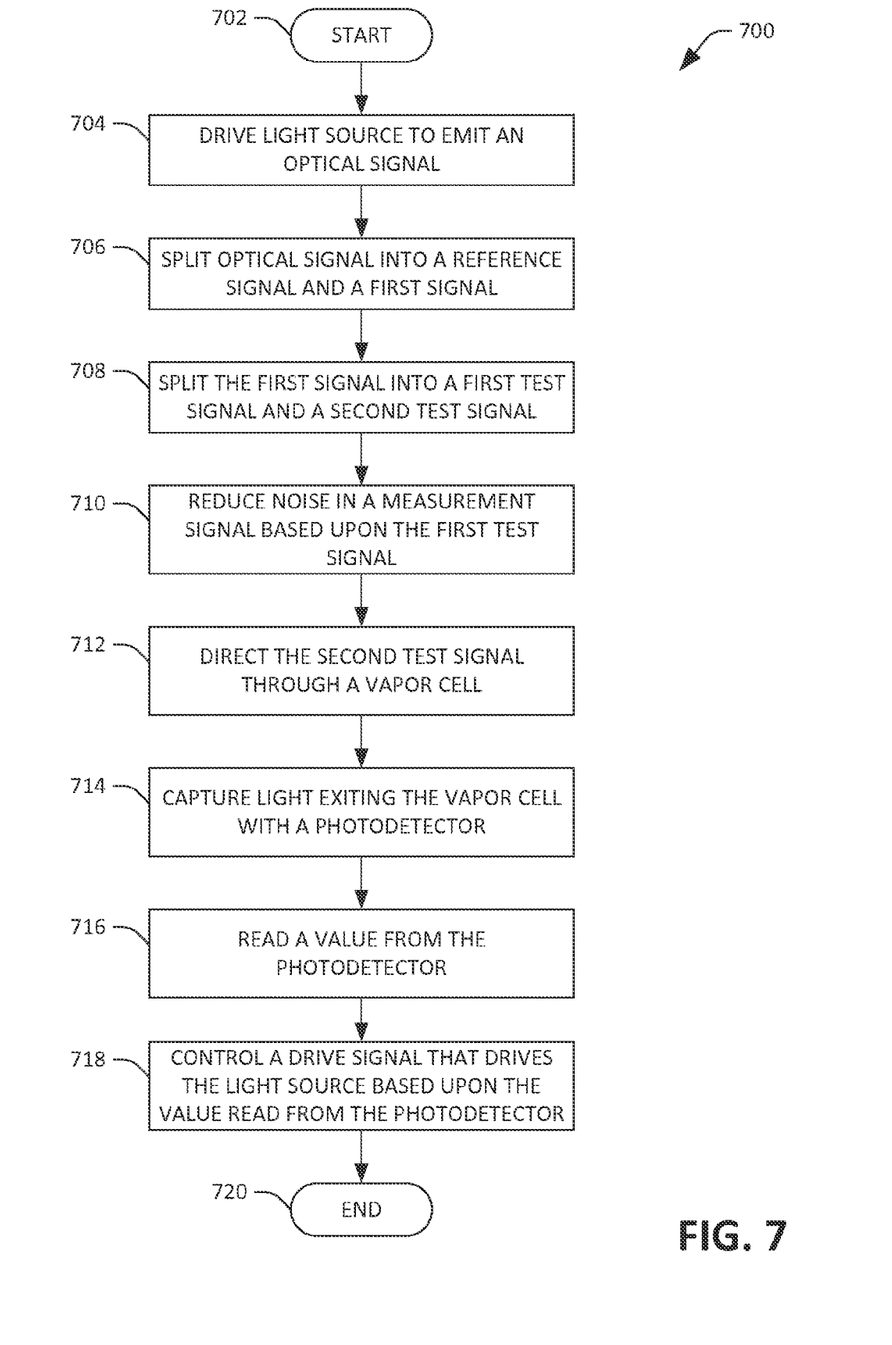
FIG. 7 is a flow diagram illustrating an exemplary methodology for calibrating a drive signal that drives a light source in a sensor device.

FIGS. 6-7 illustrate exemplary methodologies relating to in situ calibration of a light source utilized in a sensor device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Now referring solely to FIG. 6, an exemplary methodology 600 for calibrating, in situ, a light source of a sensor device that is configured to provide a reference signal to an interferometer is illustrated. The methodology 600 starts at 602, and at 604, the light source is driven to emit an optical signal. At least a portion of the optical signal is directed to the interferometer as the reference signal, wherein the reference signal desirably has a constant wavelength. For instance, the constant wavelength can be an absolute reference. At 604, it is identified that a wavelength of the reference signal has drifted from the constant wavelength.

At 608, the light source is calibrated in real-time (and in situ) responsive to identifying that the wavelength of the reference signal has drifted from the constant wavelength.

Calibrating the light source includes causing the wavelength of the reference signal to have the constant wavelength. For instance, a drive signal provided to the light source can be controlled to cause the light source to emit the optical signal with the constant wavelength. The methodology 600 completes at 610.

With reference to FIG. 7, an exemplary methodology 700 that facilitates controlling a drive signal corresponding to a light source in a sensor device is illustrated. The methodology 700 starts at 702, and at 704 the light source is driven to emit an optical signal. At 706, the optical signal is split into a reference signal and a first signal. For example, a first beam splitter can be employed to split the optical signal into the reference signal and the first signal.

At 708, the first signal is split into a first test signal and a second test signal. At 710, noise in a measurement signal output by an interferometer in the sensor device is reduced based upon the first test signal. For example, a first photodetector can be configured to capture the first test signal and emit an electrical signal responsive to capturing the first test signal, wherein the electrical signal is indicative of intensity of the first signal. The electrical signal can be used to reduce mode noise in a measurement signal output by the interferometer.

At 712, the second test signal is directed through a vapor cell. For instance, a mirror can be positioned to cause the second test signal to enter the vapor cell. Moreover, several mirrors can be positioned relative to the vapor cell to extend the interaction length of light passing through the vapor cell. At 714, light exiting the vapor cell is captured using a second photodetector. At 716, a second electrical signal generated by the second photodetector is received, wherein the second electrical signal is indicative of intensity of the light captured by the second photodetector. At 718, the drive signal corresponding to the light source is controlled based at least in part upon the second electrical signal. The methodology 700 completes at 720.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A sensor device, comprising:
   an optical measurement system;
   a microscale light source that emits a monochromatic optical signal, the optical measurement system configured to receive a reference signal and generate a measurement signal based upon the reference signal, the reference signal based upon the optical signal and configured to comprise a constant wavelength; and
   a calibration system that facilitates in situ calibration of the microscale light source to mitigate drift from the constant wavelength, wherein the calibration system comprises:
       a first beam splitter that is positioned relative to the microscale light source to receive the optical signal, the first beam splitter outputting the reference signal and a second optical signal responsive to receiving the optical signal;
       a second beam splitter that is positioned relative to the first beam splitter to receive the second optical signal, the second beam splitter outputting a first test signal and a second test signal responsive to receiving the second optical signal;
       a first photodetector that is positioned relative to the second beam splitter to receive the first test signal, the first photodetector configured to capture the first test signal and generate a first electrical signal responsive to receiving the first test signal, wherein the first electrical signal includes an amplitude of the first test signal;
       a noise reduction circuit configured to receive the first electrical signal from the first photodetector and to reduce mode noise in a measurement generated by the optical measurement system based upon the first electrical signal received from the first photodetector, wherein the noise reduction circuit is further configured to compute a ratio signal, which is the measurement signal divided by the first electrical signal, and to subtract the ratio signal from the measurement signal, thereby reducing mode noise in the measurement signal;
       a filter that is positioned relative to the second beam splitter to receive the second test signal, the filter configured to absorb light having the constant wavelength while allowing unabsorbed light to exit the filter;
       a second photodetector that is positioned relative to the filter to capture light that exits the filter, wherein the second photodetector generates a second electrical signal responsive to capturing the light that exits the filter and indicates whether wavelength drift has occurred;
   wherein each of the optical measurement system, the microscale light source, and the calibration system is internally integrated within the sensor device, and
   wherein the sensor device is configured to output a sensor signal based on the reference signal.

2. The sensor device of claim 1 being one of a thermometer, a microphone, a magnetometer, an accelerometer, a gyroscope, a seismometer, or a gravimeter.

3. The sensor device of claim 1, the calibration system further comprising:
   a first circuit that receives 1) a measurement signal output by the optical measurement system and 2) the first electrical signal from the first photodetector, wherein the first circuit corrects the measurement signal output by the optical measurement system based upon the first electrical signal.

4. The sensor device of claim 1, the calibration system further comprising:
   a control circuit that receives the second electrical signal and controls operation of the microscale light source based upon the second electrical signal.

5. The sensor device of claim 4, wherein the control circuit controls a drive signal for the microscale light source based upon the second electrical signal.

6. The sensor device of claim 4, wherein the control circuit controls operation of the microscale light source based upon the first electrical signal and the second electrical signal.

7. The sensor device of claim 4, the calibration system further comprising:

a first mirror positioned relative to the filter to extend an interaction length of the filter with respect to the second test signal.

8. The sensor device of claim 1, wherein the filter comprises a vapor cell that receives a portion of the optical signal, the vapor cell configured to absorb light having the constant wavelength.

9. The sensor device of claim 8, wherein the vapor cell comprises an atomic species that is configured to absorb light having the constant wavelength while allowing unabsorbed light to exit the vapor cell.

10. The sensor device of claim 9; the calibration system further comprising:
a first mirror positioned relative to the vapor cell to extend an interaction length of the vapor cell with respect to the second test signal.

11. The sensor device of claim 1, wherein the microscale light source is a VCSEL.

12. The sensor device of claim 1, the optical measurement system being an interferometer.

13. The sensor device of claim 1, wherein the first and second photodetectors are coplanar.

14. A method for calibrating a microscale light source of a sensor device configured to provide a reference signal to an interferometer, the method comprising:
driving the microscale light source to emit a monochromatic optical signal;
splitting the optical signal into a reference signal and a first signal employing a first beam splitter, wherein at least a portion of the optical signal is received by the interferometer as the reference signal, and wherein the reference signal is configured to comprise constant wavelength and a constant amplitude;
splitting the first signal into a first test signal and a second test signal employing a second beam splitter;
reducing mode noise in a measurement signal by the interferometer of the sensor device based upon an amplitude of the first test signal, which comprises:
configuring a first photodetector to capture the first test signal and emit an electrical signal responsive to capturing the first test signal, wherein the electrical signal is indicative of intensity of the first signal;
computing a ratio signal, which is the measurement signal divided by the electrical signal; and
subtracting the ratio signal from the measurement signal, thereby reducing mode noise in the measurement signal;
identifying that at least one of a wavelength or an amplitude of the reference signal has drifted from the constant wavelength or the constant amplitude, respectively, based upon the second test signal, wherein the reducing step and identifying step can be conducted concurrently or in any order; and
calibrating the microscale light source in situ and in real-time responsive to identifying that the at least one of the wavelength or the amplitude of the reference signal has drifted from the constant wavelength or the constant amplitude, respectively, wherein calibrating the microscale light source comprises causing the at least one of the wavelength or the amplitude of the reference signal to have the constant wavelength or the constant amplitude, respectively.

15. The method of claim 14, the sensor device being one of a pressure sensor, a thermometer, a microphone, a magnetometer, an accelerometer, a gyroscope, a seismometer, or a gravimeter.

16. The method of claim 14, wherein identifying that the at least one of the wavelength or the amplitude of the reference signal has drifted from the constant wavelength or constant amplitude, respectively, comprises:
directing a portion of the optical signal through a vapor cell, the vapor cell configured to absorb light at the constant wavelength; and
detecting light that has exited the vapor cell.

17. The method of claim 14, wherein identifying that the at least one of the wavelength or the amplitude of the reference signal has drifted from the constant wavelength or the constant amplitude comprises:
directing a portion of the optical signal through an optical resonator; and
detecting light that has exited the optical resonator.

18. The method of claim 14, the microscale light source being a monochromatic laser or a VCSEL and integrated into the sensor device.

19. The method of claim 14, wherein calibrating the microscale light source in situ and in real-time comprises controlling a drive signal for the microscale light source based upon the identifying that the at least one of the wavelength or the amplitude of the reference signal has drifted from the constant wavelength or the constant amplitude, respectively.

20. The method of claim 14, further comprising outputting a sensor signal based on the reference signal.

* * * * *